C. R. UNDERHILL & D. J. KELSEY.
MACHINE FOR PRODUCING ELECTRICAL COILS.
APPLICATION FILED SEPT. 30, 1912.

1,110,166.

Patented Sept. 8, 1914.

5 SHEETS—SHEET 1.

C. R. UNDERHILL & D. J. KELSEY.
MACHINE FOR PRODUCING ELECTRICAL COILS.
APPLICATION FILED SEPT. 30, 1912.

1,110,166.

Patented Sept. 8, 1914.

5 SHEETS—SHEET 2.

Witnesses
C. L. Weed
M. P. Nichols

Inventors
Charles R. Underhill
Duane J. Kelsey
by Seymour Earle
atty.

C. R. UNDERHILL & D. J. KELSEY.
MACHINE FOR PRODUCING ELECTRICAL COILS.
APPLICATION FILED SEPT. 30, 1912.
1,110,166.  Patented Sept. 8, 1914.
5 SHEETS—SHEET 3.
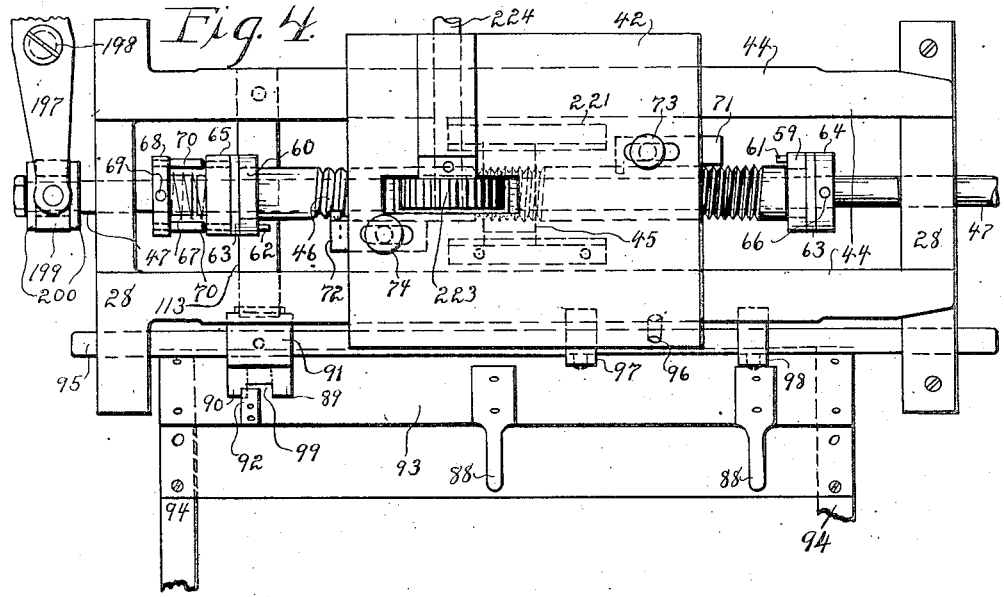
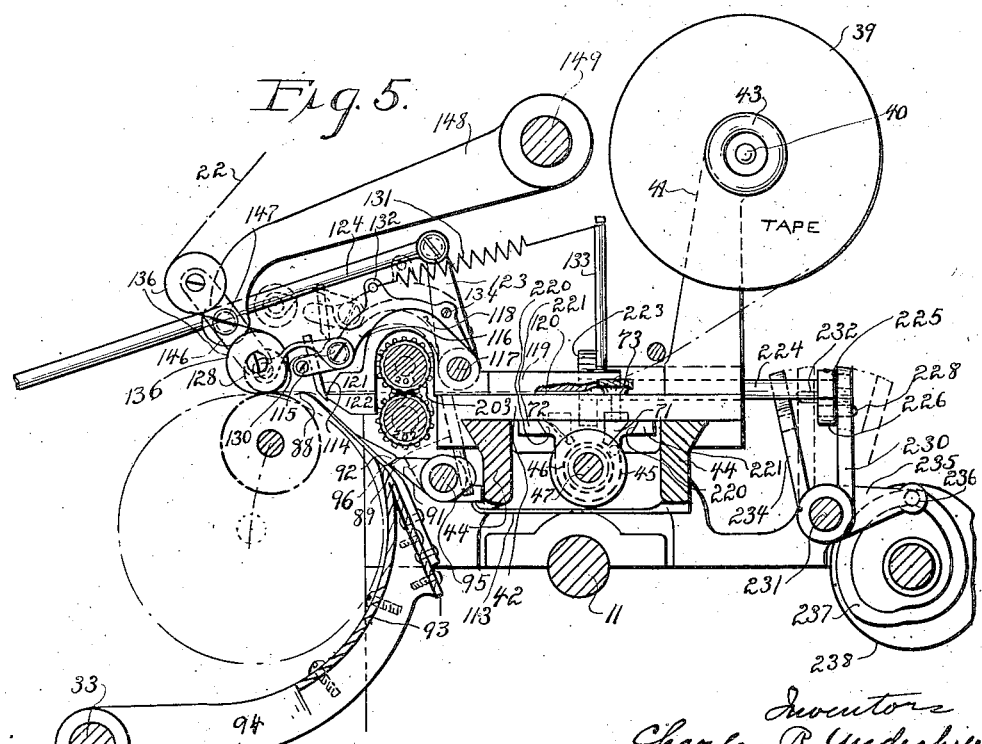

C. R. UNDERHILL & D. J. KELSEY.
MACHINE FOR PRODUCING ELECTRICAL COILS.
APPLICATION FILED SEPT. 30, 1912.
1,110,166. Patented Sept. 8, 1914.
5 SHEETS—SHEET 4.
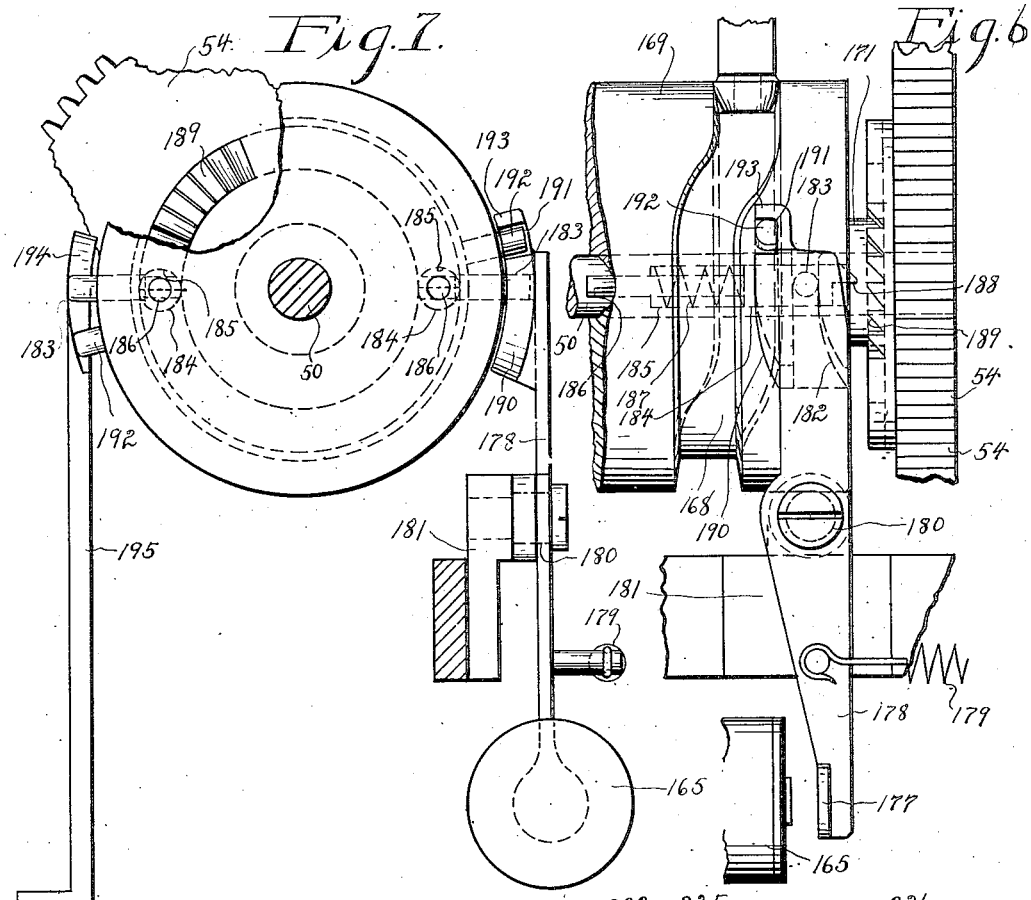
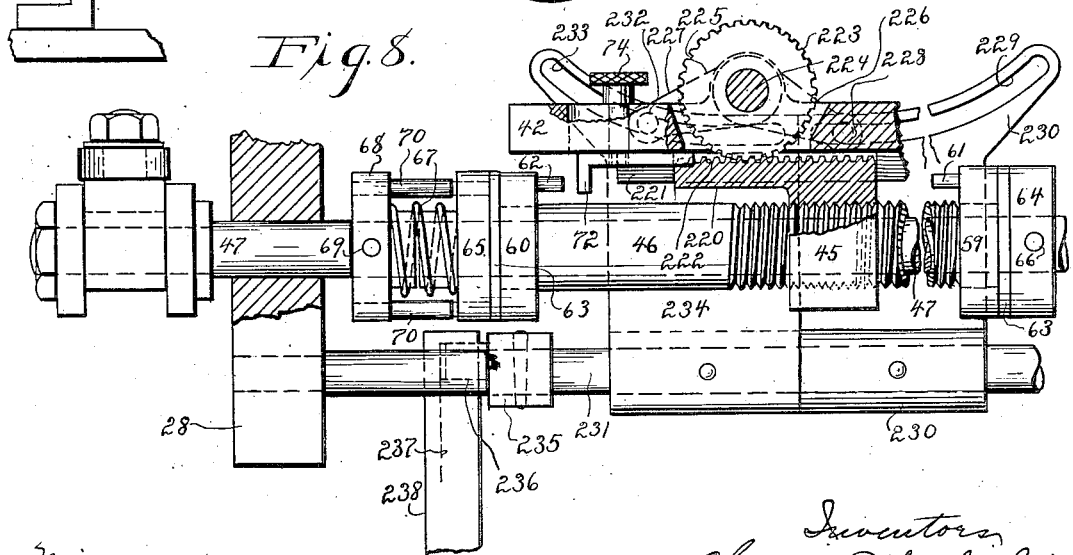
Witnesses
C. L. Weed
M. P. Nichols
Inventors
Charles R. Underhill
Duane J. Kelsey
by Seymour & Earle
Atty C. R. UNDERHILL & D. J. KELSEY.
MACHINE FOR PRODUCING ELECTRICAL COILS.
APPLICATION FILED SEPT. 30, 1912.
1,110,166.
Patented Sept. 8, 1914.
5 SHEETS—SHEET 5.
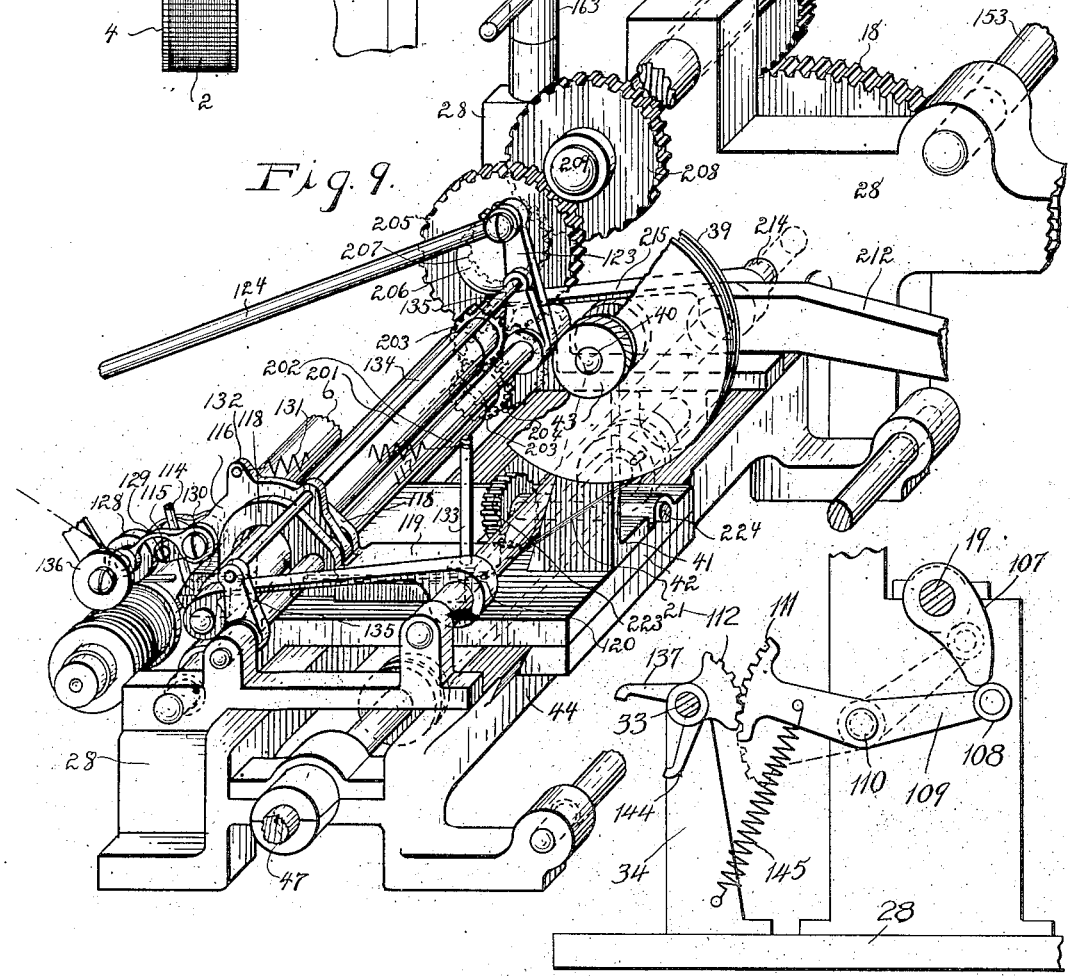

UNITED STATES PATENT OFFICE.

CHARLES R. UNDERHILL AND DUANE J. KELSEY, OF NEW HAVEN, CONNECTICUT, ASSIGNORS TO THE ACME WIRE CO., OF NEW HAVEN, CONNECTICUT, A CORPORATION.

MACHINE FOR PRODUCING ELECTRICAL COILS.

1,110,166. Specification of Letters Patent. Patented Sept. 8, 1914.

Application filed September 30, 1912. Serial No. 723,069.

*To all whom it may concern:*

Be it known that we, CHARLES R. UNDERHILL and DUANE J. KELSEY, citizens of the United States, residing at New Haven, in the county of New Haven and State of Connecticut, have invented a new and useful Improvement in Machines for Producing Electrical Coils; and we do hereby declare the following, when taken in connection with the accompanying drawings and the characters of reference marked thereon, to be a full, clear, and exact description of the same, and which said drawings constitute part of this application, and represent, in—

Figure 1:
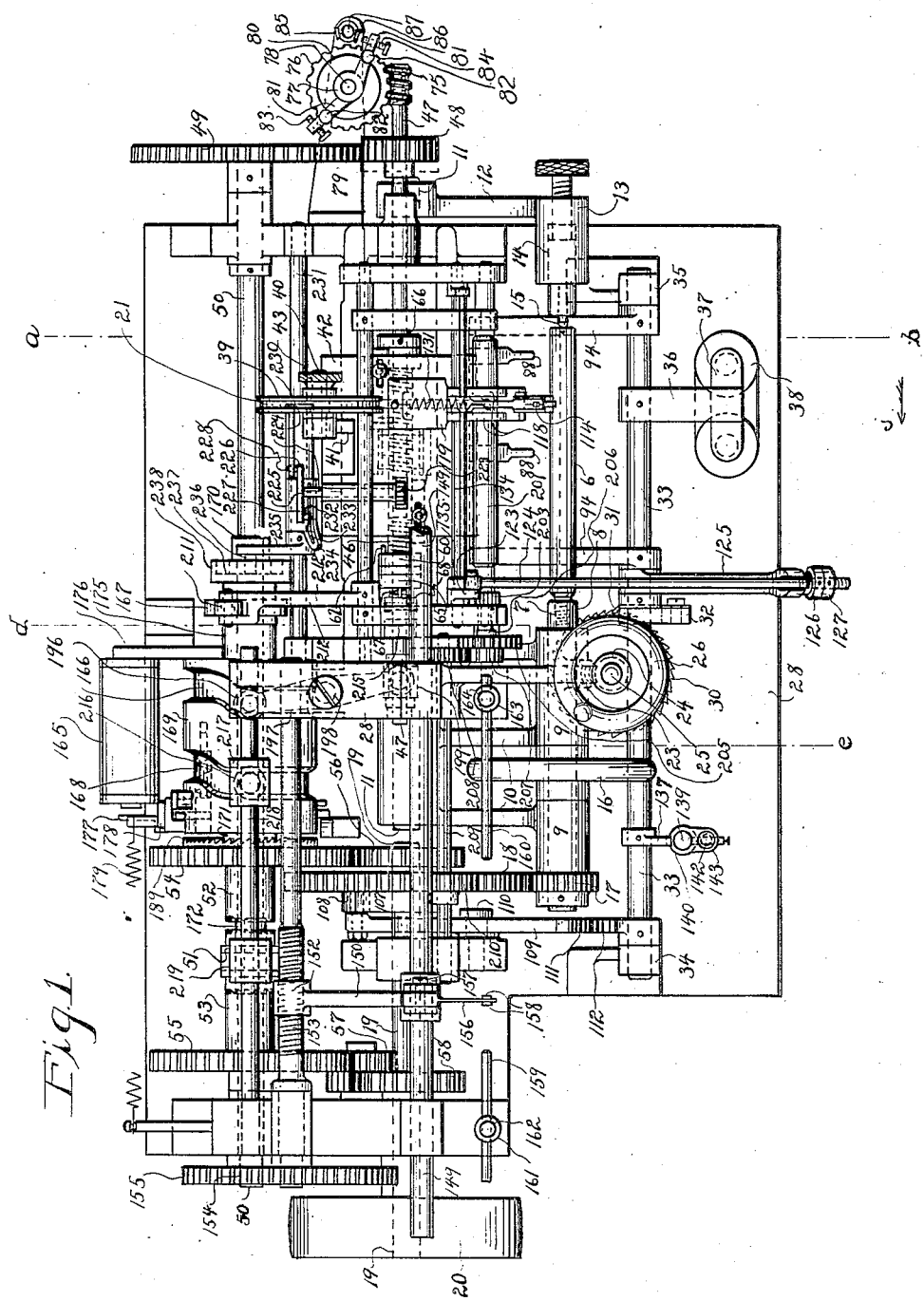
Figure 2:
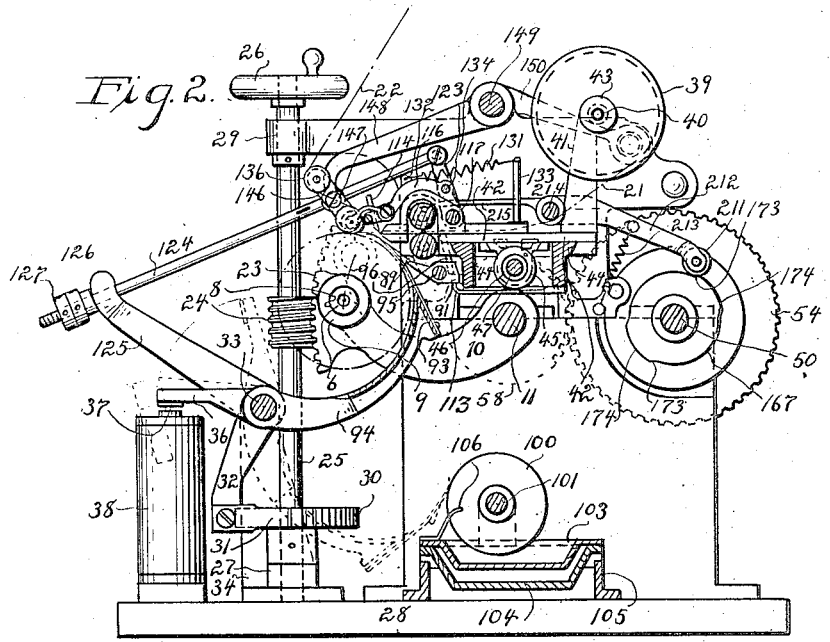
Figure 3:
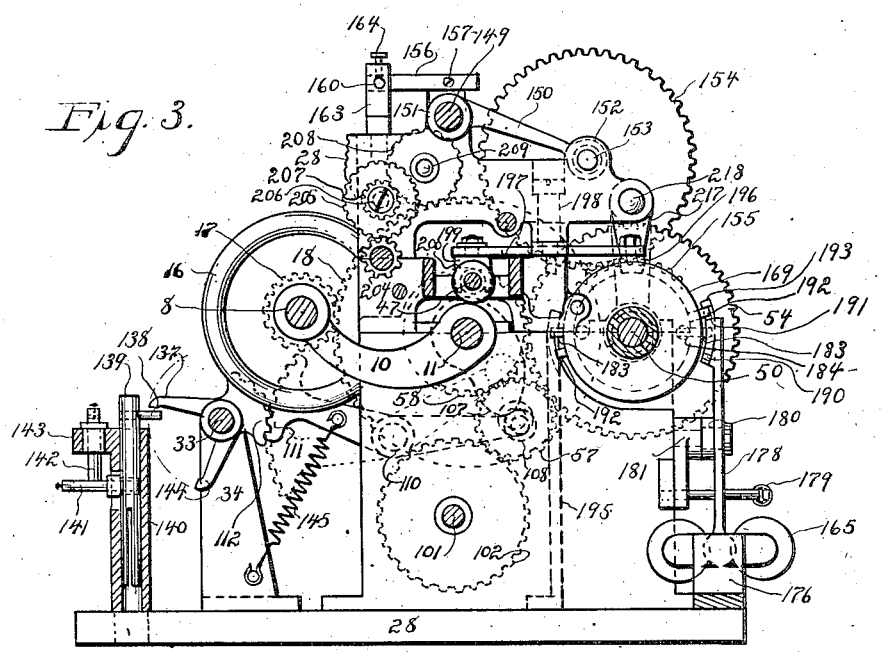

Figure 1 a plan view of one form which a machine constructed in accordance with our invention may assume. Fig. 2 a view of the machine in vertical transverse section on the line *a—b* of Fig. 1, looking toward the inner or driving end of the machine in the direction of the arrow *c*. Fig. 3 a view of the machine in vertical transverse section on the irregular lines *d—e* of Fig. 1, looking in the same direction as in Fig. 2. Fig. 4 a detached plan view on an enlarged scale of the tape-carriage with the tape-guide omitted, and designed in particular to show the mechanism employed for feeding the carriage and for determining the timing of the fingers. Fig. 5 a partial view in vertical transverse section on the line *a—b* of Fig. 1, this view being enlarged to show the details of the tape-guides, the tape-gumming mechanism, the tape-severing mechanism, the tape-feeding mechanism and the mechanism for progressing the overlapping of the tape. Fig. 6 a detached broken view in side elevation of the cam-cylinder together with the means employed for connecting it with, and disconnecting it from its driving gear. Fig. 7 a broken view in end elevation of the parts shown in the preceding figure. Fig. 8 a detached broken view partly in front elevation, and partly in vertical longitudinal section, designed in particular to show the tape-carriage and the means employed for progressively increasing its rate of traverse in either direction so as to produce a progressive increase in the overlapping of the tape. Fig. 9 a broken perspective view of the tape-carriage and tape-guide, together with the tape-severing and tape-feeding mechanisms. Fig. 10 a broken schematic view of one form of coil which may be produced on our improved machine, this view illustrating the progressive overlapping of the tape and the formation of end-closures. Fig. 11 a view in elevation of an electric coil provided with end-closures. Fig. 11ª a greatly enlarged broken view of one end of the coil a portion of which is broken away to show a dab of glue upon the inner face of the outer end of one of the sections of paper from which one of the end-closures of the coil is built up. Fig. 12 a detached broken view in side elevation, with particular reference to showing the mechanism for oscillating the rock-shaft 33 by which the glue-fingers 88 are carried.

Our invention relates to an improvement in machines for producing that class of electric coils in which the layers of wire are insulated from each other by spirally-wound tapes whether or not the tapes are progressively increased in their overlap to proportion the insulation to the electrical stress in the wire, and whether or not the coils are provided at their ends with solid end-closures produced by the spiral winding of the tapes, the object of the invention being to provide an automatic or semi-automatic machine for the rapid and accurate production of electric coils of the character described.

With these ends in view, our invention consists in a machine having certain details of construction and combinations of parts as will be hereinafter described and pointed out in the claim.

Before proceeding to describe the specific machine chosen for the illustration of our invention, it may be explained that the machine is designed for the production of such electrical coils as are shown and described in United States Patents Nos. 1,036,935 and 1,036,936 granted August 27, 1912, or of coils having the same general characteristics; that is to say, coils built up of alternate layers of helically wound wire and tape, whether or not the tape is wound with a progressively increasing overlap, and whether or not the coils are provided at their ends with solid, spirally-wound end-closures of tape.

In Figs. 10, and 11, we have shown a coil typical of the product of our machine, and consisting of alternate helically-wound layers 2 of wire, and tape 3 flanked by spirally-wound end-closures 4, the coils of tape in the insulating layers thereof being applied with a progressively increasing overlap disposed with reference to offsetting the electrical stress. In coils for certain classes of work this feature is desirable, but in other coils not important.

In Fig. 11$^a$ we have indicated the minute dabs of adhesive employed to fasten the ends of the tape to the coil in building up the end-closures; but it is conceivable that the use of an adhesive for this purpose may be dispensed with. We may further preface our description by saying that for convenience we shall speak of the left-hand end of the machine, where its driving pulley 20 is located, as its inner end, and the right hand end of the machine as its outer end. The front of the machine will then be the side nearest the attendant, and the back of the machine the side opposite the attendant. We may further add that that machine chosen for illustration might be modified in a great variety of ways by the substitution of different forms of mechanical appliances, without altering its general mode of operation and its function. As herein shown, the winding-spindle 6 is threaded at its left hand end 7 to adapt it to be mounted in a driving-spindle 8 journaled in a sleeve 9 located at the ends of rock-arms 10 depending from a rock-shaft 11 the opposite or outer end of which carries a depending-arm 12 having an integral tail-stock 13 carrying a tail-spindle 14 provided with the usual tail-end or center 15 which, as usual, supports the outer end of the said winding-spindle 6. The driving-spindle 8 carries a hand-wheel 16 and is furnished at its inner end with a pinion 17 meshing into a driving-gear 18 mounted on the main driving-shaft 19 the extreme inner end of which is provided with a driving pulley 20 receiving power from any convenient source. Inasmuch as the tape 21 of paper or other insulating material, and the wire 22 must always be fed to the coil at the same level, it is necessary that the winding-spindle 6 shall recede from this point at the rate at which the coil is being built upon the spindle. To effect the recession of the spindle 6 for the purpose described, the sleeve 9, aforesaid, is formed upon its outer face with a segmental rack 23 (Fig. 2) engaged by a worm 24 mounted upon a vertically arranged shaft 25 provided at its upper end with a hand-wheel 26 and having its lower end mounted in a step 27 fastened to the base or frame 28 of the machine. At its upper end the shaft 25 is journaled in an arm 29 fastened to the machine-frame 28. Near its lower end the shaft 25 carries a ratchet-wheel 30 by which step-by-step rotary movement is imparted to the shaft through a spring pawl 31 carried by an arm 32 depending from a rock-shaft 33 journaled at its ends in brackets 34, 35, fastened to the base of the machine-frame 28. For the described recession of the winding-spindle 6 by the step-by-step rotation of the shaft 25, the rock-shaft 33 is furnished with an arm 36 carrying the armature 37 of an electro-magnet 38 the circuit through which is periodically closed by mechanism controlled by the tape-traverse mechanism, as will be described later on. Under the step-by-step rotation of the shaft 25, the winding-spindle 6 is caused to recede at a fixed rate of recession from the level at which the tape 21 and wire 22 are fed. After the completion of a coil, the winding-spindle 6 is restored to its initial level by manually reversing the shaft 25 by the hand-wheel 26 or in some other way, the pawl 31 being held out of engagement with the ratchet-wheel 30 at this time. The tape 21 of paper or any other suitable and available insulating material, is coiled upon an ordinary tape-reel 39 turning upon a stud 40 in a bracket 41 fastened to the rear of the tape-carriage 42. The stud 40 is furnished with a removable thumb-nut 43 for the replacement of the reel 39 as required. The tape-carriage 42 (Figs. 4, 5) has dovetail connection with fixed guide-ribs 44 fastened to the frame of the machine and arranged parallel with the length thereof.

For the actuation of the traverse of the tape-carriage 42 for feeding the tape 21 helically to the winding-spindle 6, the said carriage 42 is furnished with a depending actuating-nut 45 receiving a longitudinally movable and frictionally driven traverse-screw 46 mounted upon a traverse-shaft 47 journaled in parts of the machine-frame 28 (Fig. 4). The traverse-shaft 47 is driven by a pinion 48 located upon it near its outer end and meshed into by a driving-gear 49 carried by the outer end of a reversing-shaft 50 which in effect is an intermediate shaft and which is furnished near its inner end with an ordinary reversing-clutch 51 the face teeth at the opposite ends of which are alternately engaged with face teeth upon the hubs 52 and 53 of oppositely driven reversing-gears 54, 55, loosely mounted upon the said shaft 50 for the reverse rotation of which they provide to effect the traverse of the tape-carriage 42 in opposite directions. The said gear 54 meshes directly into, and is driven by, a gear 56 carried by the extreme outer end of the driving-shaft 19 (Fig. 1), while the gear 55 is meshed into and oppositely driven by an intermediate pinion 57 meshing into a gear 58 also fastened to the driving-shaft 19. The operation of the clutch 51 for reversing the traverse of the tape-carriage 42 will be taken up later on in connection with the description of the reversal of the traverse of the wire feed.

As the traverse of the tape-carriage 42 in opposite directions must be stopped at the ends of its movement without stopping the traverse-shaft 47, the traverse-screw 46 is frictionally mounted upon the said shaft with which it normally rotates with a capacity, however, for being engaged and held against rotation for stopping the traverse of the tape-carriage. As shown, the traverse-screw 46 is provided at its respective ends with friction heads 59, 60, carrying inwardly projecting stop-pins 61, 62. The outer faces of the said heads 59, 60, co-act with friction disks 63 interposed between them and friction-collars 64 and 65. The collar 64 is fastened by a pin 66 to the traverse-shaft 47, while the collar 65 is adapted to have restricted sliding movement upon the said shaft 47 so as to be operated by a take-up spring 67 interposed between the said collar 65 and a collar 68 fastened to the shaft 47 by a pin 69 and carrying driving-pins 70 entering the collar 65 and coupling it with the shaft 47 for rotation therewith, but permitting it to have slight longitudinal movement with respect thereto, as already described. The described sliding connection of the collar 65 with the shaft 47 takes the place of an ordinary spline.

The stop-pins 61, 62, co-act with longitudinally adjustable stops 71, 72, clamped against the lower face of the tape-carriage 42 by means of clamping-screws 73, 74. As the tape-carriage 42 approaches either end of its traverse, one or the other of its stops 71 or 72 engages with the stop-pin 61 or 62, and so holds the traverse-screw 46 against rotation with the traverse-shaft 47, which, however, will continue to rotate within the said screw 46 against the friction produced between the head 59 and the collar 64, and the head 60 and the collar 65. The traverse-screw 46 now held against rotation in one direction, is still free to rotate with the traverse-shaft 47 in the opposite direction, so that when the rotation of the traverse-shaft 47 is reversed by the reversing mechanism described, the traverse-screw 46 will be reversed with it and start the return travel of the tape-carriage 42, whereby the stop and pin just engaged, will be disengaged at the conclusion of the initial reverse rotation of the traverse-screw 45 after which, the engagement between the said stop and pin being broken, the screw 46 will be free to continue its reverse rotation with the shaft 42 until the screw is again stopped for the stoppage of the tape-carriage by the co-action of the stop and stop pin at the opposite end of the traverse, when the operation just described will be repeated.

In the machine chosen for illustration, we have provided for furnishing the coils with end-closures built up step-by-step by feeding the tape to the spindle in the fixed intervals between the traverse movements of the tape-carriage 42 which must be at rest during the formation of the end-closures which call for winding the tape spirally rather than helically. The continued revolution of the traverse-shaft 47 after the traverse of the tape-carriage 42 has been stopped, causes a worm 75 (Fig. 1) upon the extreme outer end of the said shaft 47, to rotate a worm-wheel 76 upon a stud 78 fixed in a bracket 79 fastened to the machine-frame 28. The worm wheel 76 is driven whenever the worm 75 is rotated by the periodically rotated shaft 47, upon which the said worm 75 is mounted. The hub 77 of the worm-wheel 76 carries a disk 80 carrying two arms 81, 81, adjustably secured in place by clamping-screws 82 carrying pressure-screws 83 and 84 which alternately press spring-contacts 85, 86, located upon opposite sides of a contact-stud 87, whereby the magnet 38 before mentioned, is energized for the actuation of the rock-shaft 33 for the purpose at this time of applying a minute dab of adhesive to the tape and thus severing it. It will thus be seen that the amount of tape wound upon the end-closure at any one time will be determined by the period elapsing between the stopping of the traverse screw 46 and the energization of the magnet 38.

At the instant the magnet 38 is energized in the manner described, the yielding glue-fingers 88 (Figs. 2, 4 and 5) are being held in positions of readiness for one or the other of them to dab a modicum of adhesive upon the tape by the co-action of one of the two prongs 89, 90, of a latch 91, with a catch 92 fastened to a sheet-metal cross-piece 93 carrying the fingers 88 and uniting the ends of two rock-arms 94, 94, mounted upon the rock-shaft 33. The said latch 91 is moved endwise with respect to the catch 92 by being mounted upon a longitudinally movable rod 95 the ends of which are journaled in parts of the machine-frame 28 (Fig. 4). For the purpose of utilizing the tape-carriage 42 for actuating the latch 91, the carriage is furnished with a pin 96 interposed between two stop-collars 97, 98, adjustably mounted upon the rod 95 and alternately engaged by the pin 96 near the ends of the traverse of the carriage 42. Normally the glue-fingers 88 are supported in positions of readiness to apply the adhesive by the co-action of the prongs 89, 90, of the latch 91 with the catch 92. In the timing of the machine one or the other of the two stop-collars 97, 98, engages with the stop-pin 96 shortly before the tape-carriage 42 reaches the end of its traverse, whereby the rod 95 is moved in the direction required for bringing the catch 92 into registration with a clearance-space 99 between the prongs 89 and 90, whereby the glue-fingers 88 will be permitted to descend by a long quick movement of the rocker-arms 94 until they are brought into contact with the peripheries of glue-wheels 100 of which only one is shown. These wheels are mounted upon a shaft 101 carrying a gear 102 meshing into the pinion 57 which meshes into the gear 58 on the driving-shaft 19 (Fig. 3.) The glue-wheels 100 revolve in an ordinary glue-pan 103 set in a hot water pan 104 supported in a frame 105, all of ordinary construction, as well as the scrapers 106 which remove the excess of glue from the wheels 100.

Just as soon as the glue-fingers 88 have been charged with the adhesive, they are swung up into their normal positions by the action of a cam 107 mounted on the driving-shaft 19 and co-acting with a cam-roll 108 mounted in the rear end of a lever 109 hung upon a stud 110 in the machine-frame 28, and having its forward end provided with a segmental rack 111 meshing into a corresponding rack, 112 on the shaft 33. The cam 107 acts to quickly carry the rock-arms 94 through the long sweep required to restore the fingers 88 to their normal positions. A helical spring 145 connected at its upper end with the forward end of the lever 109, and at its lower end with the bracket 34, operates to hold the cam-roll 108 hard against the cam 107, and insures the depression of the glue-fingers 88 when they are liberated by the release of the catch 92 by the lateral movement of the latch 91. The spring 145 is always exerting an effort to depress the glue-fingers 88, the function of the latch 92 being to support them in their normal or lifted positions. During the time required for the depression and elevation of the glue-fingers 88, the movement of the tape-carriage 42 has continued and carried with it the rod 95, whereby the clearance-space 99 of the latch 91 has been moved out of registration with the catch 92 which engages with the lower face of one or the other of the latch-prongs 89, 90, according as the tape-carriage is at one end of its traverse or the other.

The catch 92 will be lifted through the medium of the cam 107 against the under face of the latch-prong engaged, whereby the shaft 95 will be rocked on its axis sufficiently to allow the catch 92 to ride, as it were, over the prong and then drop down into engagement with the upper face thereof, whereby the glue-fingers 88, now charged with glue, will be held in positions of readiness to be moved through the short distance required for one or the other of them to apply its modicum of adhesive to the tape by the energization of the magnet 38, and the following movement of the rock-shaft 33 which lifts the said glue-fingers through the very short arc required for one of them to apply its charge of adhesive. A flat or leaf-spring 113 (Figs. 4 and 5) fastened to the machine-frame 28 engages with the rear end of the latch 91 and rocks the rod 95 forward so as to insure the return of the latch 91 into its normal position after it has been lifted by the catch 92 as described. In the timing of the machine, the catch will now support the rock-arms 94 and the glue-fingers 88 in their normal or lifted positions, until the tape-carriage 42 has very nearly completed its reverse traverse, during which new layers of tape and wire have been added to the coil being formed. Then preparatory to again applying a dab of adhesive to the tape and severing the same, one or the other of the stops 97 98, is engaged by the pin 96, and the shaft 95 moved just enough to register the clearance-space 99 with the catch 92 which permits the fingers to descend and be touched with glue, immediately after which they are lifted by the cam 107 to their normal positions, after which they are moved by the energization of the magnet 38 for one or the other of them, as the case may be, to apply its modicum of glue to the tape.

By employing a magnet for the final movement of the glue-fingers 88, we are enabled to time them with a far greater degree of accuracy than would be practical by the use of a cam upon which we rely to move them through the greater portion of their travel. By the employment of the catch 92, the glue-fingers 88 are normally supported in their lifted positions; otherwise, the arms 94 would be raised by the cam 107 for every revolution of the driving-shaft 19, whereas by using the catch 92, the cam 107 operates effectively only once for every traverse of the tape-carriage 42. The tape having been touched with an adhesive is severed, as shown, by a knife 114 which may actually cut the tape or puncture it, or otherwise weaken it so that it will part under its own tension. In using the term "knife," therefore, we do not limit ourselves to any specific instrumentality in this place. The knife 114 is adjustably mounted by means of a clamping-screw 115, in the split forward end of a curved knife-carrying arm 116 loosely mounted upon the rock-shaft 117 between two arched or bowed arms 118 at the forward end of a tape-guide 119 secured to the forward portion of the tape-carriage 42 and formed in its lower face with a guide-way 120 which receives the tape which is fed forward through this guide-way into position to be delivered to the winding-spindle 6. The rock-shaft 117 is supported at its ends in parts of the machine-frame 28, and passes through the inner ends of the arched arms 118 which, at their extreme forward ends, carry a horizontally arranged paper-delivery plate 121 which supports an anvil 122 with which the knife 114 co-acts, the parts 121 and 122 co-acting with each other to effect the final delivery of the tape. As shown, the arched arms 118 are formed integral with the tape-guide 119, and the plate 121 with the forward ends of the arms 118.

For the rocking of the knife-shaft 117, it is provided with a rock-arm 123 to the upper end of which is connected the inner end of an operating-rod 124 the forward end of which rests in the forked upper end of a rock-arm 125 fastened to the rock-shaft 33 and therefore participating in the slight rocking movement imparted thereto by the energization of the magnet 38 which thus performs the three-fold function of effecting the application of adhesive to the tape and the severance thereof and the step-by-step recession of the winding-spindle 6 as already described. The rod 124 is connected to the forked arm 125 by means of an adjustable nut 126 and a locking-nut 127. As shown, the gluing of the tape precedes the severing of the tape, but this arrangement might be reversed. The gluing and severance of the tape are timed by the proper adjustment of the parts, and may be varied as desired. In any case the tape will be touched with glue so that when it is severed, its glued portion will form its coil end. In case the end-closures are dispensed with, the severance and gluing of the tape in the manner described, will probably be retained. The glued end or coil of the tape will now be pressed down upon the next inner coil of the said end-closure by means of a pressure-roll 128 journaled in the outer end of a yielding arm 129 the inner end of which is fastened by a bolt 130 to the forward end of the knife-carrying arm 116 as shown in Fig. 5. The pressure of the roll 128 upon the tape begins just before, or, as the tape is being severed, and continues until the knife-retracting spring 131 begins to lift the knife 114. The forward end of the said spring 131 is attached to a lug 132 upon the arm 116, while its rear end is connected to a post 133 rising from the rear end of the tape-guide 119. In case only one knife 114 is employed to sever the tape at the opposite ends of the coil, it must participate in the travel of the tape-carriage 42, and therefore the knife-carrying arm 116 must be free to slide upon the knife-shaft 117 which forms the center upon which the arm 116 turns. To provide for rocking the shaft 117, and also for the reciprocation of the knife 114, we employ a knife-operating rod 134 sliding freely through the inner end of the arm 116 and mounted at its ends in fixed arms 135 secured to the knife-shaft 117 and partaking of the rocking movement thereof.

The knife-retracting spring 131 in lifting the knife 114 into its retired position, as shown in Fig. 5, lifts the pressure-roll 128 sufficiently above the path of the wire-guide rolls 136 to provide clearance for the same as, in their traverse, they approach the ends of the coil. But for the clearance of the pressure-roll 128 from the paths of the wire-guide rolls 136, it would not be necessary to lift the knife 114 so far away from the anvil 122 as is shown in Fig. 5. The action of the spring 131 in lifting the knife 114 and the pressure-roll 128 must be preceded by the demagnetization of the magnet 38. This is provided for by furnishing the rock-shaft 33 with an arm 137 (Fig. 3) co-acting with a pin 138 mounted in the upper end of a friction plunger 139 supported in an upright sleeve 140 fastened to the base of the machine-frame 28. The plunger 139 carries a pin 141 located in the circuit of the magnet 38 and normally in contact with a pin 142 also located in the circuit of the magnet 38 and adjustably mounted in a lug 143 offsetting from the upper end of the sleeve 140. The particular circuit-breaker described may, of course, be replaced by any one of a great variety of devices of this sort. Just as the magnet 38 completes the rocking of the shaft 33, the arm 137 engages with the pin 138 and depresses the plunger 139 and so breaks the contact between the pins 141 and 142, whereby the magnet 38 cuts itself out of the circuit and permits the spring 131 to act to retract the knife 114 and the pressure-roll 128. An arm 144 mounted upon the rock-shaft 33 and complementary to the arm 137 aforesaid, engages the under face of the pin 138 and so raises the plunger 139 and brings the pin 141 into contact with the pin 142 as the rock-shaft is turned to the limit of its inward movement by the spring 145 which turns the rock-shaft 33 to the same extent on the inward movement that it is turned on the outward movement by the cam 107. The arm 144, therefore, closes that portion of the circuit at the sleeve 140 preparatory to the next successive energization of the magnet 38. Before the circuit is re-closed at the sleeve 140 as just described, the worm 75 has broken the circuit at the contact stud 87 (Fig. 1) in connection with the tape-shifting function of the device.

Since, in the operation of the machine, the tape 21 and the wire 22 start at one end of the coil at the same time, the tape, on account of being much wider than the diameter of the wire will "make", so to speak, faster than the same and reach the limit of its traverse long enough before the wire reaches the limit of its traverse to have time to supply a predetermined number of coils to the end-closure and be gummed and severed, and still have time to wait before the wire reaches the end of its traverse.

With reference now more particularly to the feeding of the wire 22, it passes over wire-guide rolls 136 adjustably mounted in the ends of a swinging-plate 146 fastened by a screw 147 to the downwardly curved end of a wire-traverse arm 148 fastened to a longitudinally movable wire-traverse rod 149 mounted at its ends in parts of the machine-frame 28 and running lengthwise therewith. The wire-traverse rod 149 is constantly reciprocated by means of a wire-traverse operating-arm 150 formed at its forward end with a sleeve 151 through which the rod 149 passes, and in which the rod is fastened. At its rear end, the said arm 150 is formed with an internally threaded hub 152 which receives a constantly driven wire-traverse screw 153 journaled in parts of the machine-frame 28 and provided at its extreme inner end with a gear wheel 154 driven by a gear wheel 155 mounted on the reversing shaft 50 in the reverse movements of which, already described, the wire-traverse screw 153 participates. In order to prepare the tape for the reversal of the wire, the wire-traverse operating-arm 150 is furnished with a flexible contact-finger 156 fastened in place by a screw 157 and provided upon its opposite faces with contact-buttons 158 (Fig. 1) which, as the case may be, respectively make contact with the contact-rods 159, 160, just before the wire completes its traverse. When this occurs, the finger 156 yields, without breaking the contact thus made, to permit the full traverse of the wire to be effected. The contact-rod 159 is mounted in a post 161 supported in the machine-frame 28 and insulated therefrom and carrying a binding-screw 162 which provides for the adjustment of the rod 159. The contact-rod 160 is mounted in a post 163 mounted in, and insulated from, the machine-frame 28 and carrying a binding-screw 164 which provides for the adjustment of the contact-rod 160. The said adjustable contact-rods 159 and 160 are located in the circuit of a magnet 165 which, for convenience, and as suggestive of its function, we shall call the "coupling" magnet, since it couples and brings into play in a cycle of closely related operations, a series of three cams, namely, the tape-shifting cam 166, the tape-feed controller cam 167, and the reversing-cam 168, all now to be described. The said cams 166 and 168 are in effect cam-paths formed in a cam-cylinder 169 loosely mounted upon the reversing-shaft 50 and held against endwise play thereon by means of a collar 170 fastened thereto (Fig. 1) and a hub 171 formed on the cam-cylinder 169 at the left hand end thereof, and bearing against the gear 54 which, in turn, is prevented from movement on the shaft 50 by a shoulder 172 thereon.

The cam-cylinder 169 is extended at its right hand end to form the cam 167 (Fig. 2), which is a double cam, and formed with two oppositely located "lifts" 173, 173, and two oppositely located "dwells" 174, the said cam 167 being separated from the cam-cylinder 169 by means of an integral hub 175 as shown in Fig. 1. We may here explain that the tape-shifting cam 166 and the reversing-cam 168 are each constructed to repeat their action in reverse order as made necessary by the reversal of the traverse of the wire and paper at each end of the coil at each half revolution of the cam-cylinder 169. The cam-cylinder 169, and hence the three cams 166, 167 and 168, are coupled with the shaft 50 for periodic operation thereby by the action of the said coupling-magnet 165 which is located at the back of the machine and mounted upon a bracket 176 secured to the machine-frame 28. The said coupling-magnet 165 acts upon an armature 177 (Fig. 6) carried by the lower end of an operating-lever 178 swung in opposition to the magnet by a spring 179 and hung upon a stud 180 in a bracket 181 of the machine-frame 28. At its upper end the lever 178 is formed with a throat-like groove 182 receiving in succession, at every half-revolution of the cylinder 169, one or the other of two laterally projecting operating-pins 183 mounted in bolts 184 located in chambers 185 entering the cam-cylinder 169 at opposite points in the inner end thereof. The bolts 184 have guiding stems 186 encircled by springs 187 located in the inner ends of the said chambers 185 and exerting a constant effort to move the bolts outward into their projected positions in which their noses 188 engage with the teeth of an annular ratchet 189 upon the adjacent face of the reversing-gear 54. The said lever 178 is also formed at its upper end with a cam-surface 190 the upper end of which drops off abruptly into a notch 191 (Fig. 6), the said cam-surface 190 and notch 191 co-acting successively with radially projecting stop-pins 192 projecting from the periphery of the cam-cylinder 169. Specifically the cam-surface 190 operates to prepare the lever 178 to effect the sudden and definite retraction of the bolts 184 from engagement with the annular ratchet 189 so that any one actuation of the cam-cylinder 169 shall be strictly limited to a half-revolution, after which it will remain at rest until the coupling-magnet 165 is again energized by the contact of the button 158 of the spring-finger 156 with either one or the other of the adjustable contact-rods 159, 160, according to the direction in which the wire is traveling. We thus provide definite periods of rest for the cam-cylinder 169 between its closely defined periodic half revolutions. In order that the cam-cylinder 169 may be definitely stopped upon its completion of a half revolution and not be carried ahead by its momentum, the lever 178 is furnished with a hook-like detent 193 (Fig. 6) which not only limits the rotation of the cylinder to a half revolution, but locks it in that position.

The two bolts 184 co-act with the annular ratchet 189 in succession, as already explained, and while it is immaterial if both bolts are engaged at the same time with the ratchet 189 when the cam-cylinder 169 is being revolved, it is necessary that both bolts be retracted at the same time to provide the cam 169 with its period of rest. For insuring, therefore, the retraction of the bolt 184 not co-acting, at the moment, with the lever 178, we provide a fixed cam 194 (Fig. 7) located diametrically opposite the upper end of the lever 178 and formed upon the upper end of an arm 195 of the machine-frame 28. As shown, the cam 194 begins the retraction of the inactive bolt before the active bolt is retracted by the lever 178, so that by the time the active bolt is retracted to stop the cam-cylinder 169, the inactive bolt will be retired to a negligible degree. Figs. 6 and 7 show the pins 183 of the bolts in the positions due to them when the cam-cylinder 169 is at rest. Supposing the cam-cylinder 169 to have made a half revolution from the position in which it is shown, the position of it would be precisely the same as in Figs. 6 and 7. It will be seen by reference to these figures, that when the coupling-magnet 165 is energized and the lever 178 operated against the tension of the spring 179, the nose 188 of the active bolt will be engaged with the ratchet 189, which will be immediately followed by the starting of the cam-cylinder 169 on a half-revolution, the action of the magnet 165 having also cleared the detent 193 from the pin 192. Before this the inactive bolt has been retracted by its pin 183 riding up the fixed cam 194 near the end of the preceding rotation of the cam-cylinder 169. Now at the very beginning of another half revolution of the cam-cylinder 169, the pin 183 will ride off the cam 194 and permit the inactive bolt to be reëngaged by its spring 187 with the ratchet 189. Both bolts will then be reëngaged with the ratchet 189 until the cam-cylinder 169 has nearly finished its half revolution, when the hitherto active bolt will be gradually disengaged from the ratchet 189 by the cam 194, and when the hitherto inactive bolt will enter the throat 182 of the lever 178 so as to be in readiness to be suddenly disengaged from the ratchet 189 at the instant the half revolution of the cam is completed. We may here explain that the circuit through the coupling-magnet 165 is broken previous to the completion of the half revolution of the cam-cylinder 169, as will be explained later on.

With reference now to the tape-shifting function of the cam 166, it receives a cam-roller 196 upon the rear end of a cam-shifting lever 197 swinging on a stud 198 mounted in a part of the machine-frame 28. The forward end of the lever 197 has swiveled in it a forked block 199 (Fig. 4) interposed between two collars 200 upon the extreme inner end of the traverse shaft 47, which, by the action of the tape-shifting lever 197, is thus bodily moved endwise, first in one direction and then in the opposite direction for a distance represented by the width of the tape being handled. This endwise or tape-shifting movement of the traverse-shaft 47 is designed to provide for shifting the end of the tape from its position of registration with the end-closure of the coil being formed, to a position at the end of the coil proper, so that when the tape is fed again, it will begin to wind upon the last coil of wire and in advance of the new coil of wire. The connection of the tape-carriage 42 with the shaft 47 so as to participate in the endwise movement thereof has already been fully explained and need not be again rehearsed. When the traverse-shaft 47 is moved endwise by the lever 197, as described, for shifting the tape, it at the same time opens the circuit through the magnet 38. In discharging this last function, the worm 75 at the right hand end of the shaft 47, acts in effect as a rack in conjunction with the teeth of the worm-wheel 76, to oscillate the same so as to disengage one or the other of the pressure-screws 83, 84, from the contact-springs 86, 85, whereby the magnet 38 is demagnetized. The tape having been shifted from the end-closure to the end of the coil proper, its free or supply-end has now to be fed. For this purpose I employ two feed-rolls 201, 202, (Fig. 5) located one above the other in front of the tape-carriage, as shown in Fig. 9, and directly under the arched integral arms 118 extending forward from the tape-guide 119, as shown in Fig. 9. At their inner ends the rolls 201, 202, are geared together by gears 203, while the lower roll 202 has mounted upon its shaft a gear 204 (Fig. 3) meshing into a gear 205 mounted on a stud 206 in a portion of the machine-frame 28. The gear 205 carries a pinion 207 driven by a gear 208 mounted on an idle shaft 209 supported at its ends in parts of the machine-frame 28 and carrying a pinion 210 meshing into the main driving gear 18. The feed-rolls 201 and 202, though constantly rotated together, are normally out of contact, the teeth of their gears 203 being sufficiently long to permit the rolls to be moved toward each other into contact for engaging and feeding the tape, and away from each other out of contact to permit the tape to be freely drawn between them by the pull of the winding-spindle 6.

It is for momentarily bringing the feed-rolls 201, 202, into contact for feeding the tape that the tape-feed controller-cam 167 (Fig. 2) is provided. A roller 211 riding upon the periphery of this cam is mounted at the rear end of a tape-feed lever 212, operated in opposition to the cam by a spring 213, and mounted upon a rock-shaft 214 provided at its ends with slightly yielding, forwardly projecting arms 215 respectively connected with the projecting journaled ends (Fig. 9) of the tape feed-roll 201 which is depressed into contact with the lower feed-roll 202 for feeding the tape when the roller 211 in the lever 212 rides over the "lifts" 173 of the cam 167. The specific relative lengths of the "lifts" 173 and "dwells" 174 of the cam 167 will be regulated according to the requirements of the positive feeding of the tape at each traverse thereof, it being necessary to cover the distance by the positive feeding of the tape from the point of severance of the tape to the contact of the tape with the wire as it begins to wrap itself upon the developing coil. As soon as the end of the tape has been caught by the action of the cam 167, the spring 213 acts to lift the tape-feed roll 201 away from the lower feed-roll 202 after which the tape is drawn between them by the revolution of the winding-spindle 6. The cam 167, as has already been explained, is a double cam and duplicates its action during each revolution so as to provide for feeding the tape once for each traverse of the tape. As the feed-roll pressure-cam 167 is functioning to feed the tape, the reversing-cam 168 begins to function to reverse the traverse of the wire and tape, though it must be said that the beginning of the reverse traverse of the tape takes place when the tape-shifting instrumentalities shifts the tape a distance represented by its width from the end-closure to the adjacent end of the coil. The said cam 168 receives a cam-roller 216 located upon the lower end of an arm 217 depending from a longitudinally movable reversing-rod 218 journaled at its ends in parts of the machine-frame 28 and carrying about midway of its length another depending arm 219 forked over the reversing-clutch 51 (Fig. 1) for sliding the same longitudinally on the reversing-shaft 50 to couple the same either with the gear 54 or the oppositely rotating gear 55. As the cam 167 is completing its function of feeding the tape, the reversing-rod 149 is shifting for reversing the wire-traverse, and the tape-carriage which has already been shifted, as described, for alining the feeding end of the tape with the end proper of the coil, begins its regular reverse traverse.

We have already explained that the cam-cylinder 169 is actuated in half revolutions with a uniform period of rest between each actuation. We should now explain that the tape-shifting cam 166, the feed-roll pressure-cam 167, and the reversing-cam 168, all forming a part of the cam-cylinder 169, perform their functions in the order named within the first half of each half revolution of the cam. In other words, the functions of the three cams are performed within a quarter revolution of the cam-cylinder 169. During the second half of each half revolution, the wire traverse-rod 149 having had its endwise movement reversed through the spring-finger 156, breaks the circuit and demagnetizes the coupling-magnet 165 when the spring 179 (Fig. 6) operated to swing the lever 178 into its normal position shortly before the half revolution of the cam-cylinder 169 is completed. Then just before the cam-cylinder 169 completes its half revolution, its stop-pin 192 rides up over the cam-surface 190 of the lever 178, and drops abruptly into the notch 193 of the lever just as the cam completes its half revolution when the spring 179 swings the lever abruptly so as to retract the nose 188 of the active bolt 184 from engagement with the ratchet 189 and so as to snap the detent 193, as it were, over the stop-pin 192. As stated at the outset of this description, the tape may be wound upon the coils with a progressively increasing overlap so as to increase the insulation at the points of electrical stress, if desired. The mechanism employed for progressively increasing the overlap of the tape, may assume a variety of forms, only one of which has been selected for illustration.

As shown in Fig. 8, provision has been made for differentiating the travel of the tape-carriage 42 from the travel of the nut 45. To this end the upper end of the nut 45 is formed with a horizontally arranged head 220 the edges of which are beveled as shown in Fig. 5, for co-action with dovetail guides 221 bolted to the lower face of the tape carriage 42, whereby the same is slidably connected with the nut 45 for movement independent thereof in the direction of the traverse-screw 46. The upper face of the head 220 of the nut is formed with a rack 222 engaged by a pinion 223 located upon the extreme forward end of a shaft 224 journaled in the carriage 42 (Fig. 1) and provided at its rear end with a rocking bar 225 having two arms 226 and 227. The said arm 226 carries an operating-pin 228 entering a segmental cam-slot 229 formed in the upper portion of a leaf 230 fastened to a rock-shaft 231 journaled in parts of the machine-frame 28. The arm 227 carries a pin 232 entering a segmental cam-slot 233 in the upper portion of a leaf 234 also fastened to the rock-shaft 231. The said shaft 231 carries a rock-arm 235 furnished with a pin 236 traveling in a cam-groove 237 in the side of a disk 238 rigidly fastened upon the right hand end of the hub 175 of the cam-cylinder 169. The leaves 230 and 234 are arranged adjacent to the opposite faces of the rocking-bar 225, and the pins 228 and 232 are mounted in the arms 226 and 227 of the bar 225 so as to project from the opposite faces thereof, as shown in Fig. 5. The function of the cam-groove 237 in the cam 238 is simply to rock the shaft 231 so as to alternately swing the leaves 230 and 234 into position for the coaction of their cam-slots 229 and 233 with the pins 228 and 232 mounted in the arms 226 and 227 of the rocking-bar 225. When the leaf 230 is swung into its operating position, as shown in Fig. 5, its cam-slot 229 receives the pin 228, while at the same time the leaf 234 is swung forward into a clearance position in which its cam-slot 233 is cleared from the pin 232. On the other hand, when the leaf 230 is swung rearward to disengage its cam-slot 229 from the pin 228, the leaf 234 is swung rearward for the engagement of its cam-slot 233 with the pin 232. The cam slots 229 and 233 are so related in position that as one gets out of engagement with its pin, the other moves into engagement with its pin and vice versa. The leaves 230 and 234 respectively provide for progressively increasing the overlapping of the tape each in one direction of the traverse thereof by the turning of the pinion 223 upon the rack 228, whereby relative movement of the carriage 42 with respect to the nut 45 is produced. The leaves 230 and 234 are swung into play by the groove 237 in the disk 238, preferably just before the action of the device employed for shifting the tape from the end-closure to the adjacent end of the coil. It is evident that if the tape-carriage 42 were rigidly fastened to the nut 45, the carriage would be moved exactly in accordance with the pitch of the traverse-screw 46. However, by mounting the carriage 42 so as to have relative movement with respect to the nut 45 as just above described, it is apparent that it will provide for the uniform progressive increase of the overlap or a variable overlap. As already stated, we do not limit ourselves to any particular mechanism for effecting the progressive overlapping of the tape.

Having already described the different phases of the operation of the machine in conjunction with the detailed description thereof, it will be sufficient to briefly state the consecutive operation of the machine in producing a coil; nor is it essential that the operations about to be described shall be strictly followed in the use of the machine.
The following description, therefore, must be viewed as merely illustrative. In the first place, a paper core is usually applied to the spindle. The tape having been properly threaded through the tape-guide of the machine, will have its free end fastened at one end to the paper core after which the machine will be started and the spindle revolved for beginning one of the two end-closures of the coil. In the operation of the machine, the tape will now be gummed and severed, and its coil-end pressed upon the rudimentary end-closure, after which the tape will be shifted inward a distance substantially corresponding to its width. The free end of the wire is now adjusted upon the wire guide-rolls of the machine and fastened to the paper core in any suitable way, after which the machine is started for automatically producing a coil, the operation having been manual up to this point. The wire-traverse and the paper-traverse acting in unison, but at different rates, now proceed to apply the first layer of tape and wire, and as the tape is much wider than the diameter of the wire, the tape reaches the opposite end of the coil sufficiently in advance of the wire to be carried beyond the end of the coil proper, and utilized to begin the end-closure at the opposite end of the coil, after which the tape is automatically gummed and severed and pressed, and the tape shifted inward for a distance equivalent to its width. Just about this time the wire completes its traverse and prepares to be reversed. As the wire is reversed, the tape is positively fed so as to be caught under the wire. The traverse of the wire and tape is now in the opposite direction, the tape moving ahead of the wire as before, and reaching the opposite end of the coil in time to make another contribution to the end-closure at the other end of the coil, and be gummed and severed and pressed down and shifted, all before the wire is reversed for the third layer of wire, and so on; these operations being repeated until the desired number of layers of wire and tape have been applied. It will be understood that as the coil is built up layer by layer, and so increased in diameter, the spindle on which it is wound is automatically depressed step-by-step for a distance approximately corresponding to the thickness of the layers, so that the tape and wire will always be fed to the coil at any period of the growth thereof, at the same level in the machine. The coil having been built up to the required size, the wire is cut by hand and the completed coil removed from the spindle, to which another paper core is now applied, after which the spindle is returned to its starting position by the hand-wheel 26, and the operation repeated for the winding of another coil.

We claim:—
A machine for producing electric coils having a wire-traverse and a tape-traverse differentiated in the speed of their travel, means for utilizing the tape in the interruptions of its traverse for the production of spirally wound end-closures, a series of cams forming a cycle operating during the interruptions of the traverse of the tape for shifting and feeding the tape and reversing the traverse of the wire and tape, and electrically controlled means for shunting the cams forming this cycle into operation.

In testimony whereof, we have signed this specification in the presence of two subscribing witnesses.

CHARLES R. UNDERHILL.
DUANE J. KELSEY.

Witnesses:
 FREDERIC C. EARLE,
 CLARA I. WEED.